US011498324B2

(12) United States Patent
Boroughs et al.

(10) Patent No.: US 11,498,324 B2
(45) Date of Patent: Nov. 15, 2022

(54) TAPE LAMINATION MACHINE CUTTING ASSEMBLY

(71) Applicant: Fives Machining Systems, Inc., Fond du Lac, WI (US)

(72) Inventors: Nicholas Boroughs, Seattle, WA (US); Duncan Kochhar-Lindgren, Seattle, WA (US); Cody Casteneda, Kent, WA (US); Nicholas Gacek, Seatec, WA (US); Amanda Kotchon, Seattle, WA (US)

(73) Assignee: FIVES MACHINING SYSTEMS, INC., Fond du Lac, WI (US)

( * ) Notice: Subject to any disclaimer, the term of this patent is extended or adjusted under 35 U.S.C. 154(b) by 144 days.

(21) Appl. No.: 17/026,989

(22) Filed: Sep. 21, 2020

(65) Prior Publication Data

US 2021/0245487 A1     Aug. 12, 2021

Related U.S. Application Data

(60) Provisional application No. 62/971,040, filed on Feb. 6, 2020.

(51) Int. Cl.
*B32B 38/00* (2006.01)
*B32B 37/00* (2006.01)
*B32B 41/00* (2006.01)

(52) U.S. Cl.
CPC ...... *B32B 38/0004* (2013.01); *B32B 37/0053* (2013.01); *B32B 41/00* (2013.01); *B32B 2310/028* (2013.01)

(58) Field of Classification Search
None
See application file for complete search history.

(56) References Cited

U.S. PATENT DOCUMENTS

| | | | |
|---|---|---|---|
| 4,182,225 A | * | 1/1980 | Reid ...................... B65C 3/02 493/299 |
| 4,591,402 A | | 5/1986 | Evans et al. |
| 5,110,395 A | | 5/1992 | Vaniglia |
| 5,273,614 A | | 12/1993 | Grimshaw et al. |

(Continued)

FOREIGN PATENT DOCUMENTS

| | | |
|---|---|---|
| CN | 103737945 A | 4/2014 |
| EP | 0250673 A1 | 1/1988 |

(Continued)

OTHER PUBLICATIONS

International Search Report and for International Application No. PCT/US2020/052109 dated Sep. 23, 2020 (3 pages).

(Continued)

*Primary Examiner* — Linda L Gray
(74) *Attorney, Agent, or Firm* — Reising Ethington P.C.

(57) ABSTRACT

A cutting assembly for a tape lamination head that applies a plurality of composite tape segments includes a cutter carriage configured to slide relative to the tape lamination head and adjacent to composite tape in a direction of composite tape movement; and a cutter assembly, carried by the cutter carriage, comprising a cutting blade and a cutting anvil, wherein the cutting blade is configured to cut the composite tape while the cutting carriage is moving at the same velocity as composite tape moving through the tape lamination head.

18 Claims, 6 Drawing Sheets

(56) References Cited

U.S. PATENT DOCUMENTS

| | | |
|---|---|---|
| 5,290,389 A | 3/1994 | Shupe et al. |
| 5,698,066 A | 12/1997 | Johnson et al. |
| 5,979,531 A | 11/1999 | Barr et al. |
| 7,063,118 B2 | 6/2006 | Hauber et al. |
| 8,438,825 B2 | 5/2013 | Beraud et al. |
| 8,954,180 B2 | 2/2015 | Oldani |
| 9,149,949 B2 | 10/2015 | Johnson et al. |
| 9,314,974 B2 | 4/2016 | Buttrick et al. |
| 9,315,007 B2 | 4/2016 | Vaniglia |
| 9,694,546 B2 | 7/2017 | Kisch |
| 9,782,937 B1 | 10/2017 | Modin et al. |
| 10,112,348 B2 | 10/2018 | Oldani |
| 2010/0186879 A1* | 7/2010 | Machamer ............ B65H 19/20 156/159 |
| 2010/0276087 A1 | 11/2010 | Weinman et al. |
| 2011/0154971 A1* | 6/2011 | Serrurier ............ F16L 11/082 83/862 |
| 2013/0111725 A1 | 5/2013 | Torres Martinez |
| 2014/0238612 A1 | 8/2014 | Vaniglia et al. |
| 2014/0305580 A1 | 10/2014 | Hagman et al. |
| 2018/0259711 A1* | 9/2018 | Kawanishi ............ G02B 6/25 |
| 2018/0361688 A1 | 12/2018 | Kaiser et al. |
| 2019/0061288 A1 | 2/2019 | Wulfsberg et al. |
| 2019/0077094 A1 | 3/2019 | Hamlyn et al. |

FOREIGN PATENT DOCUMENTS

| | | |
|---|---|---|
| EP | 2495093 B1 | 4/2015 |
| WO | 2017105892 A1 | 6/2017 |

OTHER PUBLICATIONS

Written Opinion for International Application No. PCT/US2020/052109 dated Sep. 23, 2020 (5 pages).

International Search Report for International Application No. PCT/US2020/037223 dated Sep. 28, 2020 (3 pages).

Written Opinion for International Application No. PCT/US2020/037223 dated Sep. 28, 2020 (4 pages).

* cited by examiner ional patent application claiming the benefit of priority from U.S. Provisional patent application No. 62/971,040 filed on Feb. 6, 2020, the entire contents of which are incorporated herein.

TECHNICAL FIELD

The present application relates to tape lamination machines and, more particularly, to a cutting assembly included with a tape lamination head.

BACKGROUND

Tape lamination machines are used to create composite workpieces. Composite material, in the form of fibrous material impregnated with resin, is applied by the machines at precise locations and lengths to collectively form a composite workpiece. The tape lamination machine moves a tape lamination head to precisely apply composite tape in the ultimate shape of the composite workpiece. As the tape lamination head moves, it leaves a plurality of composite tape segments, also referred to as a course, or tows, behind. The automatic application of these composite tape segments involves the cooperation of a diverse collection of machinery that holds, moves, and ultimately cuts the composite tape.

After a defined amount of composite tape is moved through the tape lamination head, the head can cut the tape to create a chosen length of composite tape. However, during the process of cutting, the tape lamination head may have to stop the movement of composite tape in order to accurately cut the tape. Stopping the movement of composite tape through the tape lamination head can decrease the speed at which composite workpieces can be formed.

SUMMARY

In one implementation, a cutting assembly for a tape lamination head that applies a plurality of composite tape segments includes a cutter carriage configured to slide relative to the tape lamination head and adjacent to composite tape in a direction of composite tape movement; a linear motor that is configured to move the cutter carriage in the direction of composite tape movement; and a cutter assembly, carried by the cutter carriage, comprising a cutting blade and a cutting anvil, wherein the cutting blade is configured to cut the composite tape while the cutting carriage is moving at the same velocity as composite tape moving through the tape lamination head.

In another implementation, a tape lamination head for applying a plurality of composite tape segments includes a frame that carries a supply reel of composite tape and a plurality of redirect rollers; a cutting assembly, slidably coupled to the frame, comprising: a cutter carriage configured to slide relative to the tape lamination head and adjacent to composite tape in a direction of composite tape movement; a linear motor that is configured to move the cutter carriage in the direction of composite tape movement at the same velocity as composite tape moving through the tape lamination head; and a cutter assembly, carried by the cutter carriage, comprising a cutting blade and a cutting anvil, wherein the cutting blade is configured to cut the composite tape while the cutting carriage is moving at the same velocity as composite tape moving through the tape lamination head.

DETAILED DESCRIPTION

A tape lamination machine includes a cutting assembly that slides along and adjacent to a composite tape path. The cutting assembly can include a cutter carriage that moves at the same speed as the composite tape passing adjacent to the assembly so that the composite tape segments can be cut while moving. Thus, the cutting assembly can move in coordination with the movement of composite tape so that the cutting blade is positioned adjacent an edge of the tape without or with only some relative movement between the blade and the tape until the blade traverses the tape. This can help make some cuts more accurately, such as plumb cuts.

Figure 1:
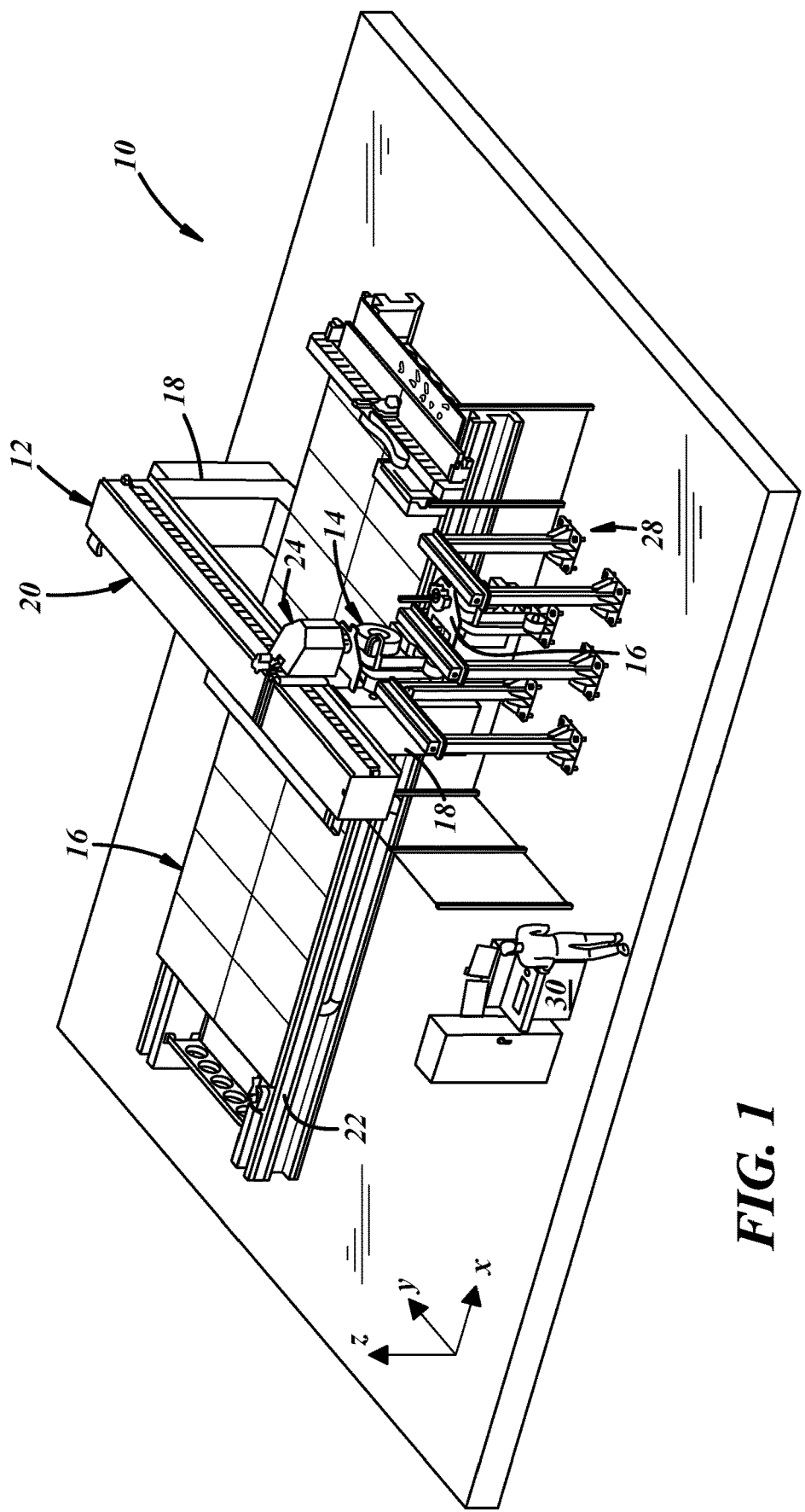
FIG. 1 is a perspective view depicting an implementation of a tape lamination machine.
Figure 2:
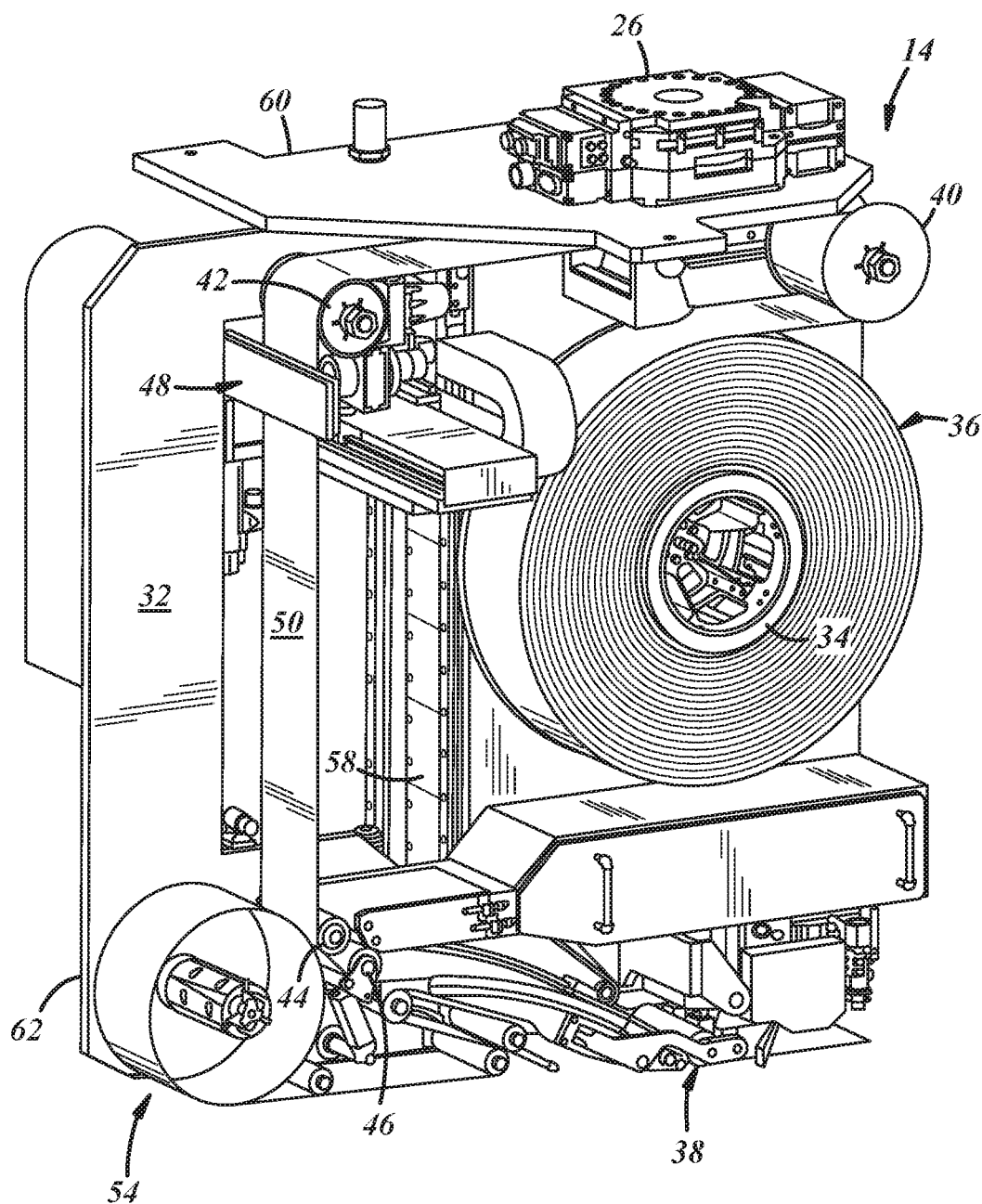
FIG. 2 is a perspective view depicting an implementation of a tape lamination head.
Figure 3:
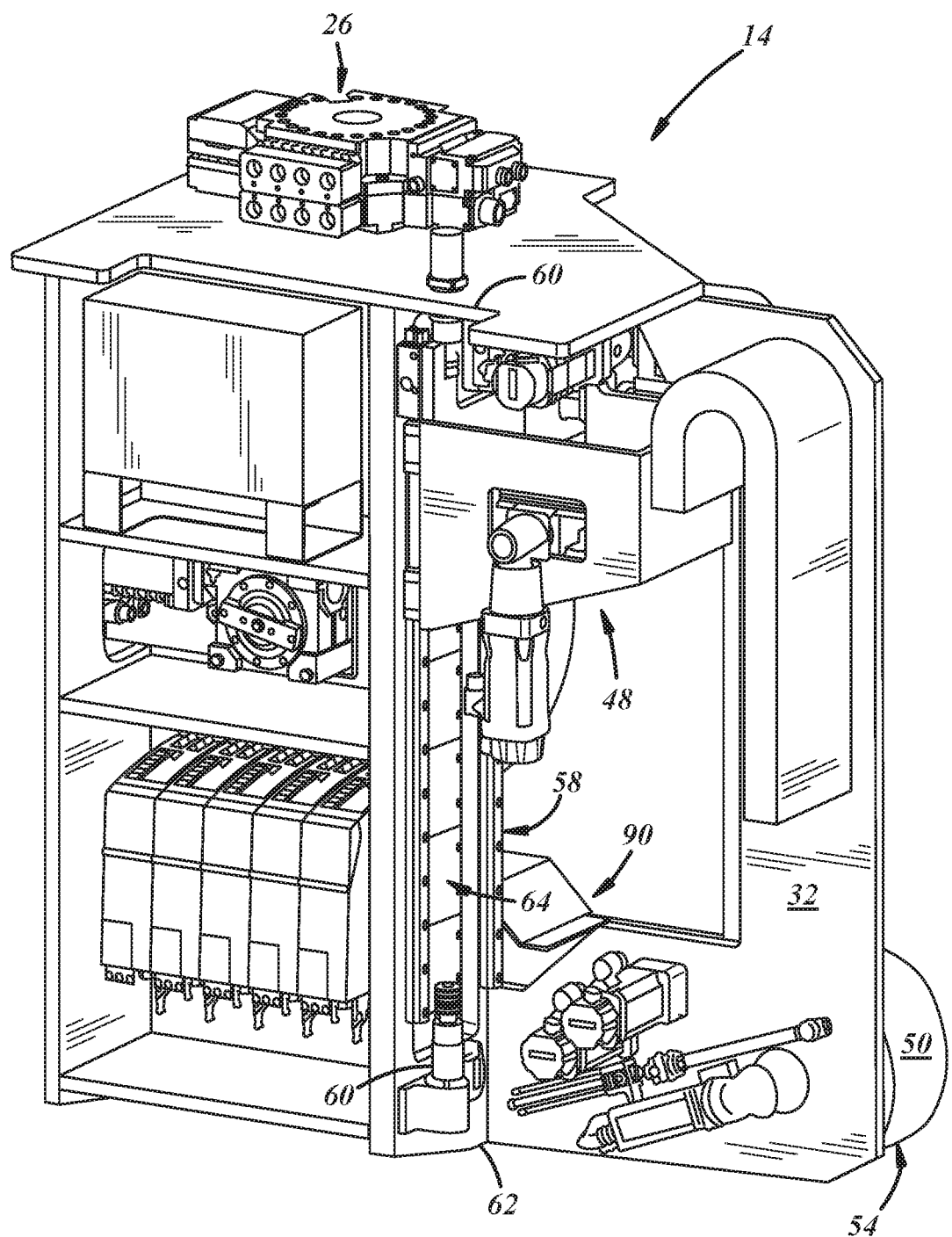
FIG. 3 is another perspective view depicting an implementation of a portion of a tape lamination head.
Figure 4:
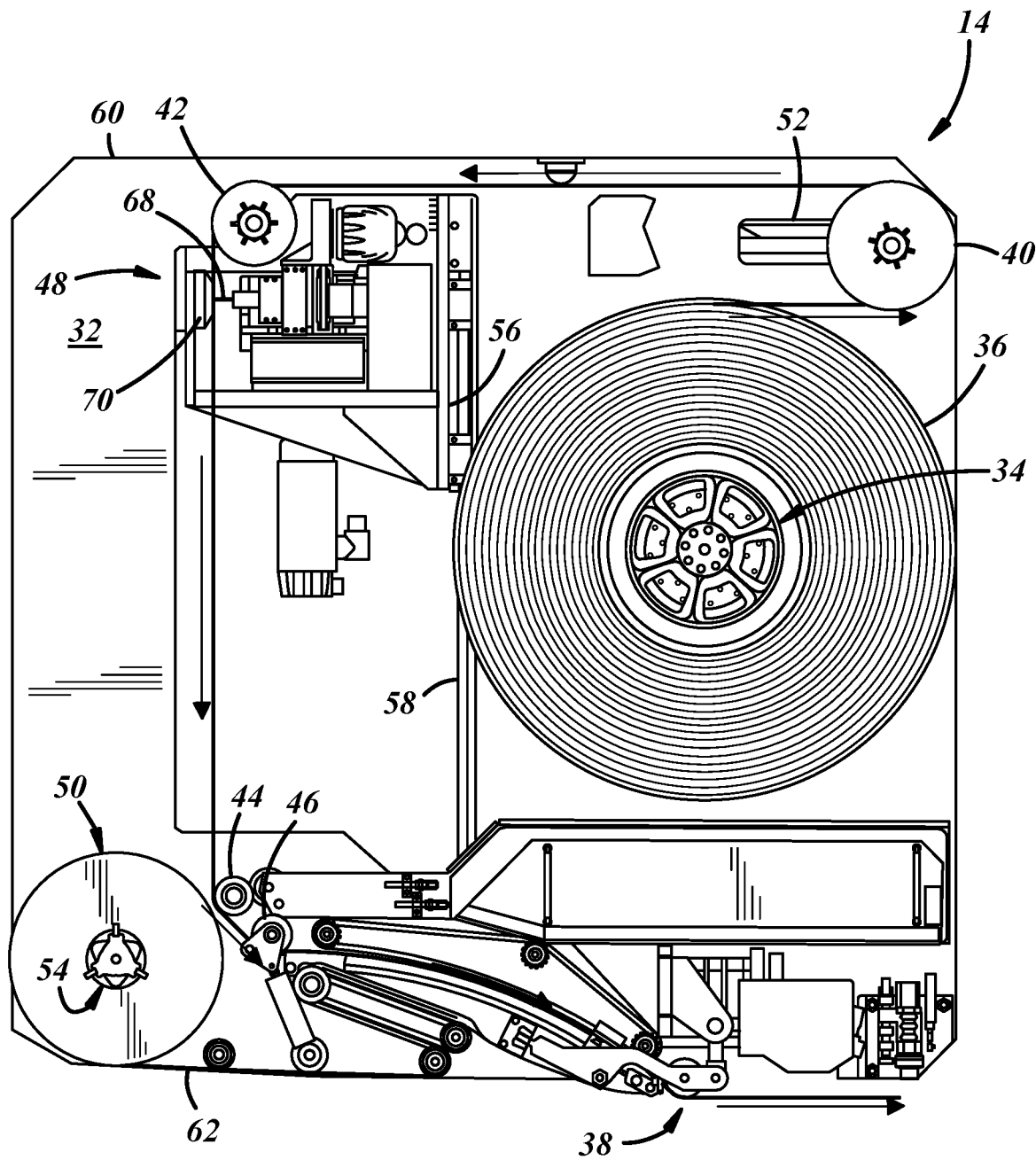
FIG. 4 is another perspective view depicting an implementation of a portion of a tape lamination head.
Figure 5:
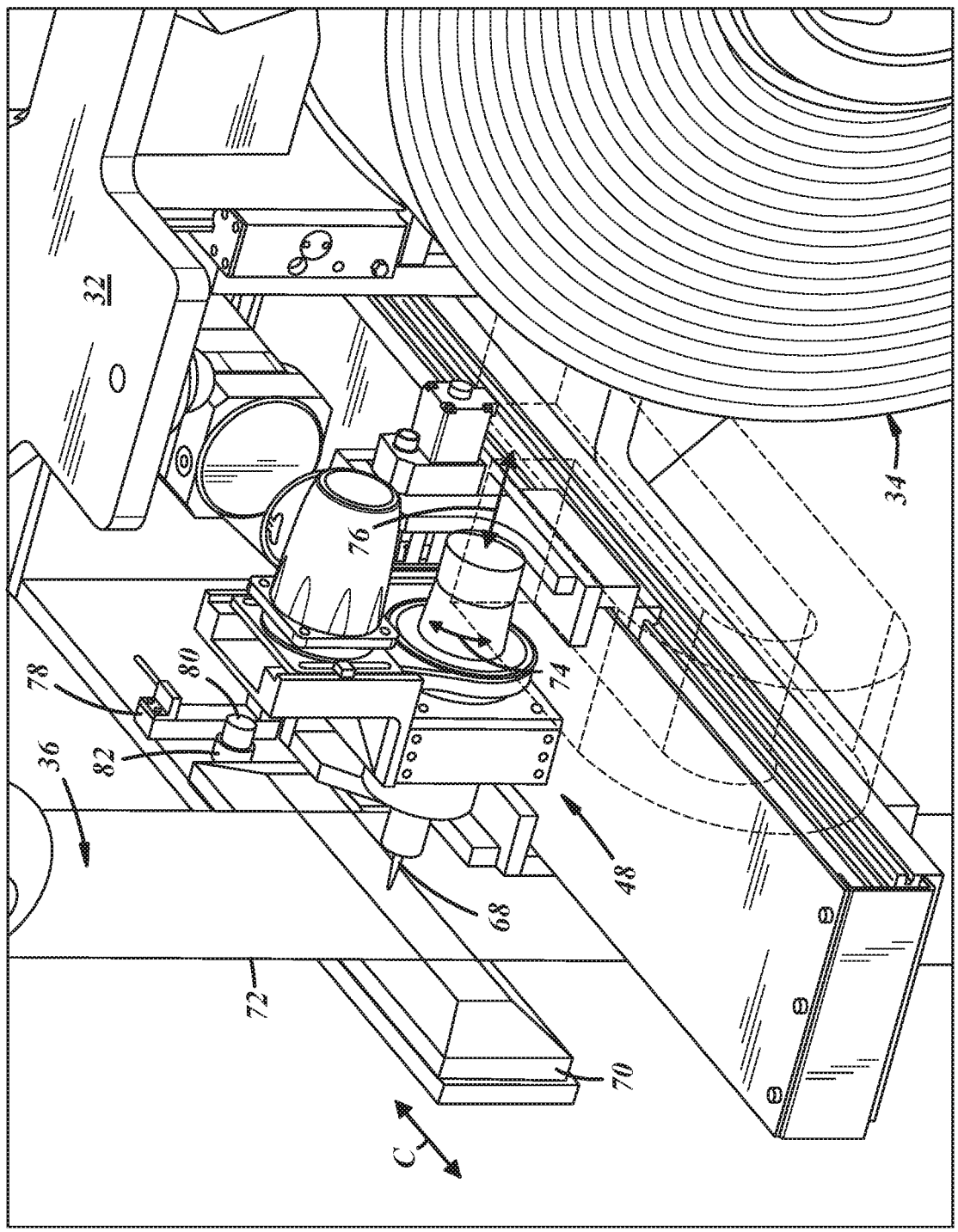
FIG. 5 is another perspective view depicting an implementation of a cutting assembly used with a tape lamination head.
Figure 6:
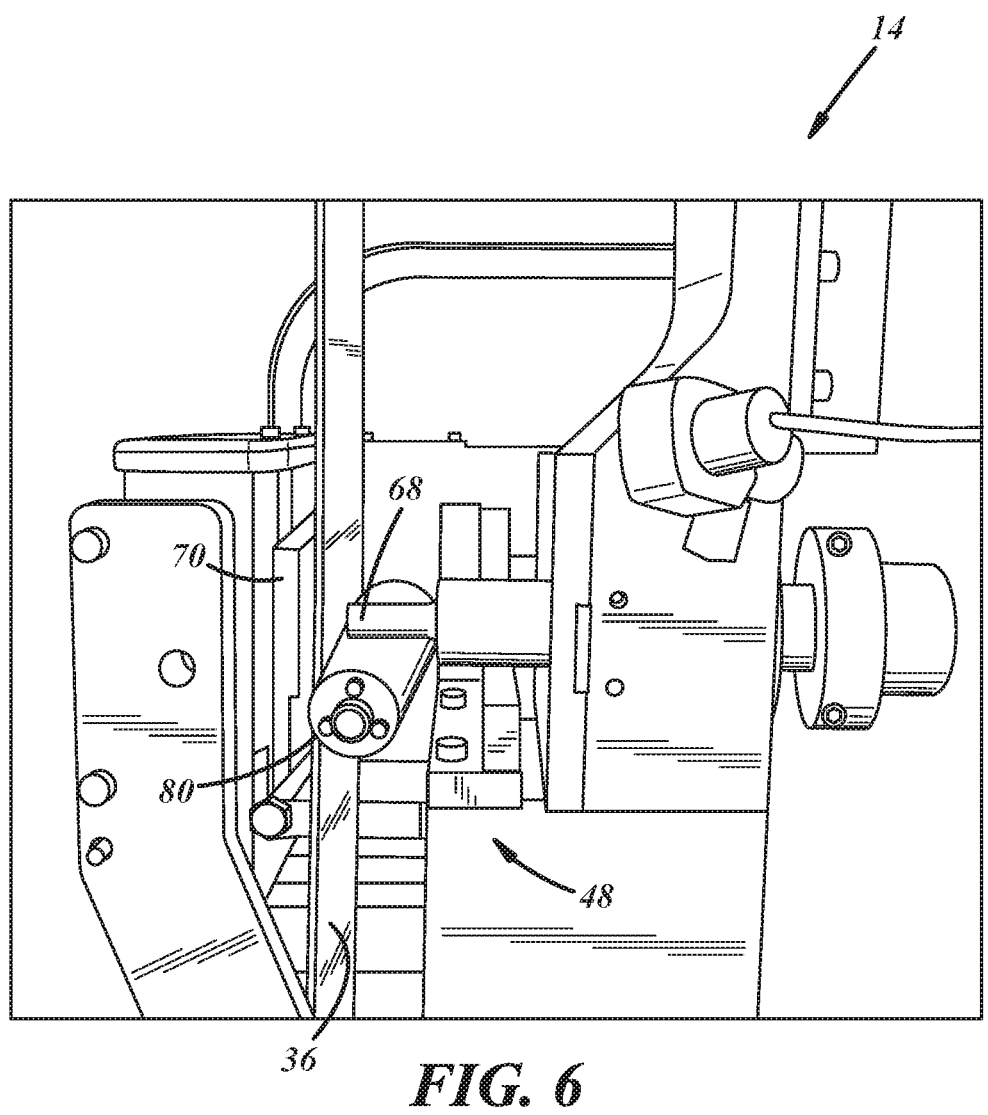
FIG. 6 is a profile view depicting an implementation of a cutting assembly used with a tape lamination head.

An implementation of a tape lamination machine 10 is shown in FIG. 1. The tape lamination machine 10 includes a gantry 12 that movably carries a tape lamination head 14 over a table base 16 on which composite parts are formed from a plurality of composite tape segments. The gantry 12 can include vertical supports 18 that are linked via a horizontal support 20 or beam attached at an upper end of the vertical supports 18. The gantry 12 can be implemented as a multiple-axis tape lamination machine 10, such as a Cincinnati CHARGER ATL or GEMINI. In one implementation, the tape lamination machine 10 can permit six-axis movement of the tape lamination head 14. The bottom of the vertical supports 18 can move linearly along an X-axis relative to the table base 16. The bottom of the vertical supports 18 can move over rails 22 or wheels to move the gantry 12 along the X-axis. In one embodiment, the rails 22 can be included on the table base 16 such that the vertical supports 18 rest on the table. In other implementations, rails 22 can be formed on the floor where the tape lamination machine 10 is installed. A ram 24 can carry the tape lamination head 14 to raise and lower the head 14 relative to the table base 16 along the Z-axis. The tape lamination head 14 can be slidably connected to the horizontal support 20 at an end of the ram 24 distal to the tape lamination head. The slidable connector can permit the frame to move in the Y-axis direction over the table base 16. A releasable connector 26 between the tape lamination head 14 and the ram 24 can permit the removal and replacement of a tape lamination head. The vertical supports 18 and ram 24 can move along the X-, Y-, and Z-axes to position the tape lamination head 14 with respect to a replacement station 28.

Afterwards, another tape lamination head 14 can be coupled to the ram 24 and moved by the gantry 12 into position over the table base 16.

Movement of the gantry 12, including the vertical supports 18 and the ram 24 can be controlled at an operator station 30. The operator station 30 includes one or more microprocessors (not shown) in communication with a computer readable storage medium having executable instructions can control movement of fluidic rams, electric motors, or other drive element thereby controlling the motion and position of the gantry 12 as well as the operation of the tape lamination head 14. The microprocessor(s) can be any type of device capable of processing electronic instructions including microcontrollers, host processors, controllers, and application specific integrated circuits (ASICs). It can be a dedicated processor used only to carry out control of the gantry 12 or can be shared with other machine functions. The microprocessor executes various types of digitally-stored instructions, such as software or firmware programs stored in memory. Communications between the mechanisms that move the gantry 12 and the tape lamination head 14, such as the fluidic rams or electric motors, and the microprocessor(s) can be carried out over a communications bus.

The tape lamination head 14 includes a frame 32 coupled to a releasable connector 26 that releasably attaches the head to the ram 24. The frame 32 can support a supply reel 34 carrying composite tape 36 that is ultimately supplied to a compaction assembly 38 applying the tape 36 to the table base 16. Along the way, the composite tape 36 can pass over a supply dancer 40, a first redirect roller 42, a second redirect roller 44, and a scrap crack-off roller 46 that collectively route the tape 36 adjacent to a cutting assembly 48. Composite tape 36 can be wound around the supply reel 34 in one of a variety of widths. For example, composite tape 36 having a width of 1.5" to 12" can be wound around the supply reel 34 for later unwinding as the composite tape 36 is passed through the tape lamination head 14. The composition of composite tape 36 is known and can include carbon fiber as an example of composite tape. A backing paper 50 can be applied to one side of the composite tape 36 so that a surface of the composite tape 36 does not touch subsequently wound layers of tape 36. The supply dancer 40, the first redirect roller 42, and the second redirect rollers 44 can be attached to dancer mechanisms 52 that control the tension exerted on the composite tape 36 pulled from the supply reel 34 and communicated to the compaction assembly 38. The dancing mechanisms 52 can permit linear movement of the rollers under control of a spring, such as a pneumatic air spring with programmatically-adjustable pressure. One or more electric motors can be used to apply rotational force to the supply reel 34, the supply dancer 40, the first redirect roller 42, or the second redirect roller 44. A backing paper reel 54 is included with the tape lamination head 14 and can accept backing paper 50 that has been removed from the composite tape 36 before the tape 36 is applied to the table base 16. In one implementation, servo motors are used that are powered by servo drives to control movement of the composite tape 36 along the supply reel 34, the supply dancer 40, or the backing paper reel 54.

The cutting assembly 48 is included with the tape lamination head 14 and moves along a linear path in a direction of composite tape movement via a cutter carriage 56. The linear path can be a rail 58 or slot over which the cutting assembly 48 moves linearly, adjacent to the path of composite tape moving toward the compaction assembly 38. In this implementation, the cutting assembly 48 moves vertically from a top portion 60 of the tape lamination head 14 to a bottom portion 62 of the head 14. A linear motor 64 can move the cutting assembly 48 along the rail 58 in the same direction or plane in which the composite tape 36 moves toward the compaction assembly 38. As the cutting assembly 48 approaches an end of its movement, a crash stop 66 can help stop the downward movement of the assembly 48.

The cutting assembly 48 can include a cutting blade 68 that cuts sections of composite tape 36 against a cutting anvil 70 as the tape 36 travels toward the compaction assembly 38. Rather than stopping the movement of composite tape 36 through the tape lamination head 14, the cutting assembly 48 can be moved in coordination with the tape 36 so that the cutting blade 68 is traveling at the same velocity as the tape 36. In that way, the only relative motion between the composite tape 36 and the cutting blade 68 occurs when the blade 68 is moved to cut the tape 36. And the speed at which the composite tape 36 passes through the tape lamination head 14 is not reduced relative when the tape 36 is not cut. In one implementation, the cutting blade 68 can move in four axes to create not only butt cuts that are perpendicular to the movement of composite tape 36 but also more complex shapes at least some of which are angled relative to an edge 72 of the tape 36. A knife rotary axis 74 and a knife depth axis 76 can be controlled using electric motors that rotate the knife or move the knife linearly relative to the axes 74, 76. In one implementation, the knife height can be adjusted with a range of movement from 5 millimeters (mm) up to 30 mm. The angle at which the cutting blade 68 is positioned and the depth of tape cuts can be monitored by a blade angle sensor 78 and a blade depth sensor 80, respectively. The cutting assembly 48 can be implemented as an ultrasonic cutter, such as a Sonotec SF 8500.

The cutting blade 68 can be moved across the composite tape 36 along a cutting traverse axis (C). In some implementations a linear actuator, such as a ball screw can move the cutting blade 68 across the tape 36 to form a composite tape segment. The cutting motion can sever one section of composite tape 36 from another while leaving the two sections attached by the backing paper 50. The connection of composite tape 36 using the backing paper 50 can facilitate moving the composite tape segments through the tape lamination head 14. Composite tape 36 cutting can be also be controlled with the cutting anvil 70 against which the cutting blade 68 cuts the tape. For example, the cutting anvil 70 can have a non-rectangular shape, such as a trapezoidal surface, and may be pivoted about an anvil pivot 82 to expose a particularly shaped cutting surface. In some implementations, the cutting assembly 48 can include a hold-down roller 80 positioned adjacent to the cutting blade 68. The hold-down roller can be positioned on a tape side of the composite tape opposing the cutting anvil 70. The hold-down roller 80 can have flanges on the outer edges of the roller 80 that are adjustable along the axis of roller rotation to center the composite tape for cutting and/or compensate for different tape sizes. The hold-down roller 80 can hold a portion of the composite tape 36 in place. The hold-down rotor 80 can be free spinning and put a slight back bend into the composite tape so it stays pressed to the cutting anvil 70 and press a portion of the composite tape 36 into contact with the anvil 70 and holding it in position.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A cutting assembly for a tape lamination head that applies a plurality of composite tape segments, comprising:
   a cutter carriage configured to slide linearly relative to the tape lamination head and adjacent to composite tape in a direction of composite tape movement; and
   a cutter assembly, carried by the cutter carriage, comprising a cutting blade and a cutting anvil, wherein the cutting blade is configured to cut the composite tape while the cutting carriage is moving at a velocity equal to a velocity of the composite tape moving through the tape lamination head.

2. The cutting assembly recited in claim 1, further comprising a rail on which the cutter carriage slides relative to the tape lamination head.

3. The cutting assembly recited in claim 1, wherein the cutter carriage moves in the direction of the composite tape movement at the velocity equal to the velocity of the composite tape moving through the tape lamination head.

4. The cutting assembly recited in claim 1, wherein the cutting anvil pivots.

5. The cutting assembly recited in claim 1, wherein the cutting assembly includes a knife depth axis.

6. The cutting assembly recited in claim 1, wherein the cutting assembly includes a knife rotary axis.

7. The cutting assembly recited in claim 1, further comprising a blade angle sensor.

8. The cutting assembly recited in claim 1, further comprising a blade depth sensor.

9. The cutting assembly recited in claim 1, wherein the cutter assembly is an ultrasonic cutter.

10. The cutting assembly recited in claim 1, further comprising a linear motor that is configured to move the cutter carriage in the direction of composite tape movement.

11. A tape lamination head for applying a plurality of composite tape segments, comprising:
    a frame that carries a supply reel of composite tape and a plurality of redirect rollers;
    a cutting assembly, slidably coupled to the frame, comprising:
    a cutter carriage configured to slide relative to the tape lamination head and adjacent to composite tape in a direction of composite tape movement;
    a linear motor that is configured to move the cutter carriage in the direction of the composite tape movement at a velocity equal to a velocity of the composite tape moving through the tape lamination head; and
    a cutter assembly, carried by the cutter carriage, comprising a cutting blade and a cutting anvil, wherein the cutting blade is configured to cut the composite tape while the cutting carriage is moving at a velocity equal to the velocity of the composite tape moving through the tape lamination head.

12. The tape lamination head recited in claim 11, further comprising a rail on which the cutter carriage slides relative to the tape lamination head.

13. The tape lamination head recited in claim 11, wherein the cutting anvil pivots.

14. The tape lamination head recited in claim 11, wherein the cutting assembly includes a knife depth axis.

15. The tape lamination head recited in claim 11, wherein the cutting assembly includes a knife rotary axis.

16. The tape lamination head recited in claim 11, further comprising a blade angle sensor.

17. The tape lamination head recited in claim 11, further comprising a blade depth sensor.

18. The cutting assembly recited in claim 11, wherein the cutter assembly is an ultrasonic cutter.

* * * * *